United States Patent [19]

Järisch et al.

[11] Patent Number: 4,653,922
[45] Date of Patent: Mar. 31, 1987

[54] INTERFEROMETRIC THICKNESS ANALYZER AND MEASURING METHOD

[75] Inventors: Walter Järisch, Boeblingen; Günter Makosch, Sindelfingen, both of Fed. Rep. of Germany

[73] Assignee: International Business Machines Corporation, Armonk, N.Y.

[21] Appl. No.: 709,862

[22] Filed: Mar. 8, 1985

[30] Foreign Application Priority Data

Oct. 31, 1984 [EP] European Pat. Off. ........ 84113059.4

[51] Int. Cl.$^4$ .............................................. G01B 9/02
[52] U.S. Cl. ..................................... 356/357; 356/360
[58] Field of Search ........................ 356/357, 359, 360

[56] References Cited

FOREIGN PATENT DOCUMENTS 759845  8/1980  U.S.S.R. ............................... 356/357

OTHER PUBLICATIONS

Briers, "Interferometric Flatness Testing of Nonoptical Surfaces", *Applied Optics*, vol. 10, No. 3, pp. 519-524.

*Primary Examiner*—Davis L. Willis
*Assistant Examiner*—Matthew W. Koren
*Attorney, Agent, or Firm*—James M. Thomson

[57] ABSTRACT

Flat objects (6), e.g. non-transparent wafers, are tested over their entire surface for thickness variations in an interferometric set-up (FIG. 1) where symmetrical opposite points on the front and rear surface, respectively are sensed by the same light ray (10). A laser beam (3) impinges under oblique angle of incidence on a beam splitter (e.g. a grating 4) to generate a reference beam (3a) and a measurement beam (3b). The latter is directed by a first of a pair of plane mirrors (5a) to the front surface of sample (6) from which it is reflected again to plane mirror (5a) to reach blazed grating (7) which deflects it symmetrically to plane mirror (5b). The rear surface of sample (6) is thus illuminated under the same angle of incidence in a way that each ray (10) is directed to the point on the rear surface that is exactly opposite to its reflection point at the front surface. The beam reflected at the rear surface passes after further reflection at plane mirror (5b) through beam splitter (4) in the same direction as reference beam (3a) thus generating an interference pattern on screen (8). The fringe separation in the interference pattern is representative of the local thickness of sample (6) and can be evaluated electronically or by pattern recondition methods to thickness readings with an accuracy of $\lambda/200$. A second embodiment of the invention uses a folded mirror instead of blazed grating (7) for the deflection.

4 Claims, 4 Drawing Figures

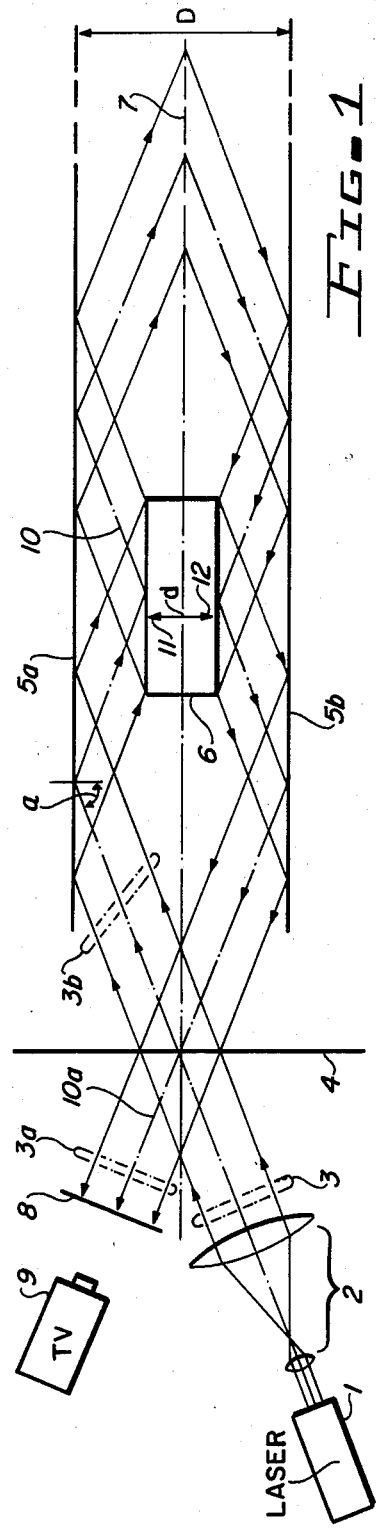
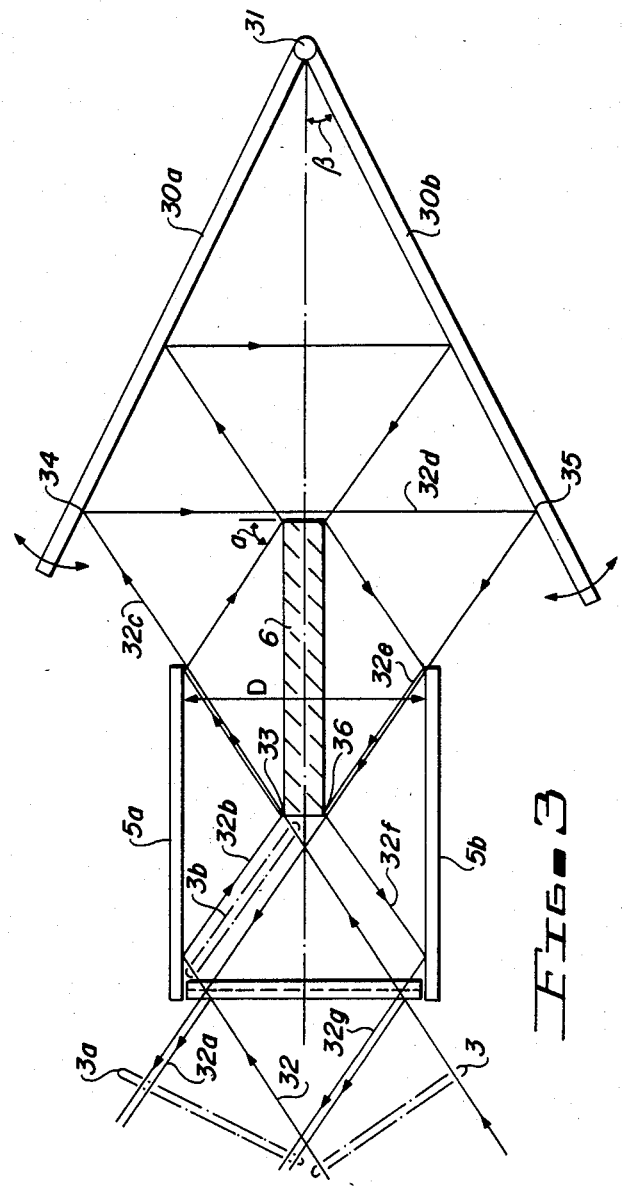

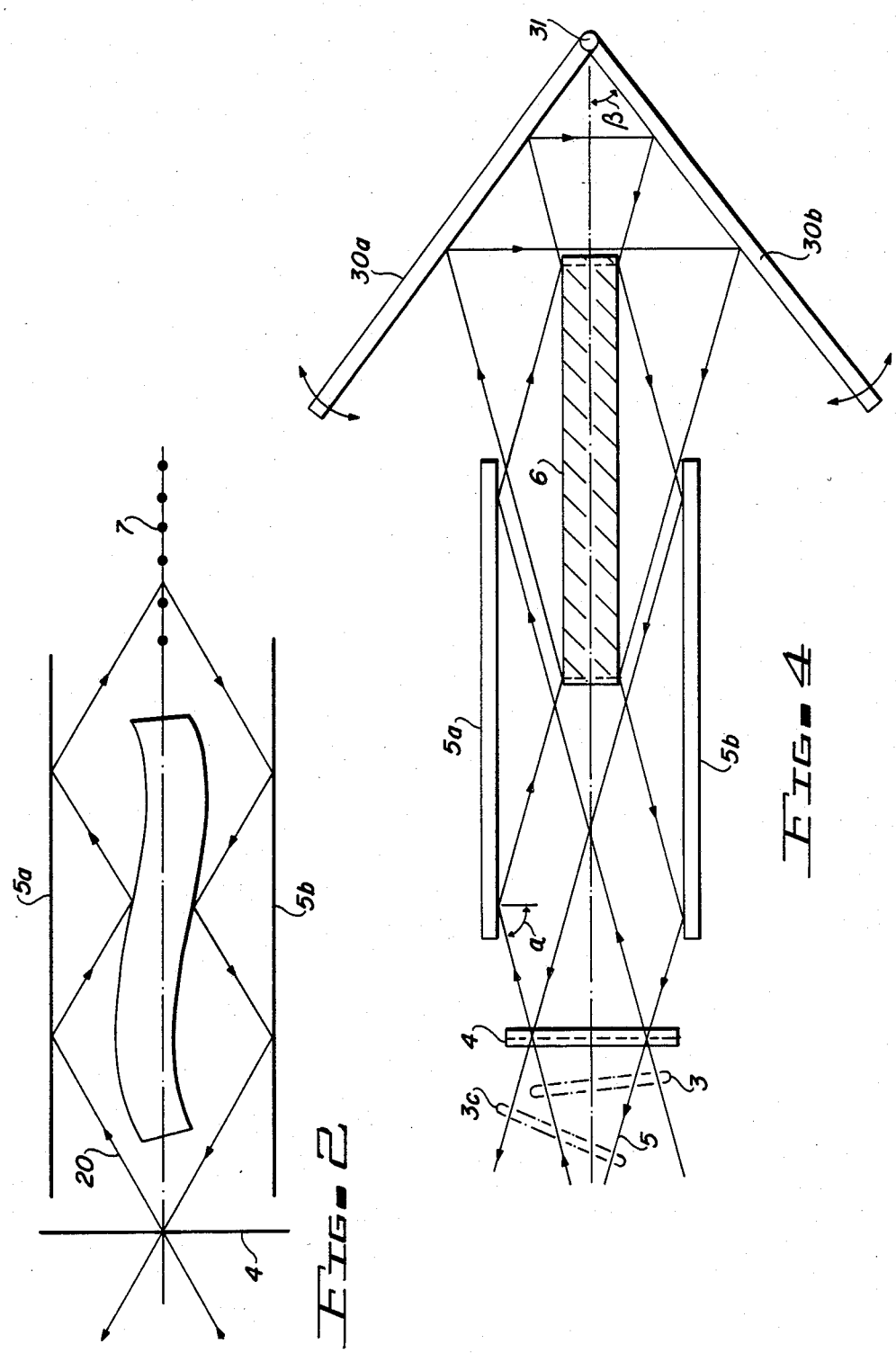

INTERFEROMETRIC THICKNESS ANALYZER AND MEASURING METHOD

BACKGROUND OF THE INVENTION

The invention relates to a method for interferometrically determining thickness variations in flat objects and to an apparatus for carrying out the method. A preferred use of the invention is in the fields of manufacturing integrated circuits and high density magnetic disks.

DESCRIPTION OF THE PRIOR ART

Modern manufacturing methods with accuracies in the range of micrometers require substrates whose thickness is controlled to the same tolerance. A particular example is in the field of photolithography where wafers with extremely plane surfaces have to be mounted in exact parallelism on the support, e.g. a chuck. Thickness variations in the wafer of one micrometer or less can lead to unacceptable overlay errors and hence to yield losses. The same problems may arise due to the limited depth of focus in high resolution optical printers.

One known method of measuring substrate thickness uses a mechanical stylus or inductive or capacitive probes to measure selected points at the surface or to scan along lines so that no complete thickness distribution of the whole surface is obtainable. In addition the surface may be damaged by the probes.

Reflecting substrates can be tested for thickness variations in an interferometric set-up with normal light incidence; for that purpose the substrate is firmly attached or clamped to a reference plane, e.g. on a chuck. This method, however, is not applicable to sensitive substrates that may be damaged by the chuck.

SUMMARY OF THE INVENTION

It is therefore the object of the present invention to provide a method and an apparatus of the aforementioned kind that allow an accurate, contactless and full area determination of the thickness distribution in a substrate.

This object is achieved by the invention as characterized in claims 1 and 2; embodiments of the invention are characterized in the dependent claims.

The invention proposes an interferometric set-up in which each ray is reflected at exactly opposite points on the front and back surfaces of the substrate, respectively before being brought to interference with a reference ray. Diffusely reflecting substrates can be measured by choosing sufficiently large angles of incidence. A very high resolution in the order of $\lambda/200$ is obtainable if the resulting interference pattern is evaluated by known electronic means. The interferometric set-up itself is of relatively simple design and can easily be used for rapid screening of all substrates entering or leaving a production line.

BRIEF DESCRIPTION OF THE DRAWINGS

Embodiments of the invention will now be described in detail with reference to the drawings wherein:

FIG. 1 shows in schematic representation a first embodiment of the invention with a blazed grating;

FIG. 2 shows the ray path when a bent substrate is measured in a set-up according to FIG. 1;

FIG. 3 shows a schematic representation of a second embodiment of the invention using a foldable mirror; and FIG. 4 shows the embodiment of FIG. 3 using an increased angle of incidence.

DESCRIPTION OF THE PREFERRED EMBODIMENT

FIG. 1 shows in schematic representation the optical set-up of a first embodiment of the invention where a blazed grating is used for beam deflection. The output beam of laser 1 is expanded in lens combination 2 to a collimated beam 3 which is split by beam splitter 4 in a first partial beam 3a which serves as a reference beam and a measurement beam 3b. The beam splitter may be a semireflecting glass plate or an optical grating. The object 6 to be measured is arranged between two flat mirrors 5a, 5b whose flatness is of better than $\lambda 20$. The angle of incidence $\alpha$ of measurement beam 3b is chosen such that it illuminates the (entire) upper surface of sample 6 where it is reflected back to mirror 5a and reaches blazed grating 7. The blazing angle of this grating is selected to deviate the measurement beam in a symmetrical way to flat mirror 5b and to the lower surface of object 6. The measurement beam is then again reflected at mirror 5b and passes beam splitter 4 to generate, together with reference beam 3a, an interference pattern on screen 8. A TV camera 9 picks up this pattern which is then processed and evaluated electronically, e.g. after digitization.

Reference numeral 10 identifies a single ray in the measurement beam 3 which is reflected at point 11 of upper object surface 6. The beam deviation by blazed grating 7 ensures that this ray probes the lower surface of object 6 at point 12 which is exactly opposite to point 11. The optical path difference of ray 10 with respect to the corresponding ray 10a in the reference beam 3a thus depends only on the distance d between points 11 and 12 such that the interference pattern is entirely determined by the thickness of sample 6.

The angle of incidence $\alpha$, the separation D of mirrors 5a, 5b and the deflection angle of blazed grating 7 are interdependent and must be chosen in accordance with the reflecting properties of sample 6. For rough surfaces the angle $\alpha$ should have a value of greater than 75° to obtain a specular reflection.

The fringe separation x in the interference pattern that corresponds to a thickness variation $\delta$ is given by $$\delta = \lambda/2x \cos \alpha.$$

The interference pattern can be evaluated visually or, with greater precision, by known picture processing devices. If a digital evaluation of the interference pattern is desired as in modern hybrid interferometers one of the plane mirrors 5a, 5b has to be wobbled in vertical direction (or, alternatively, blazed grating 7 in horizontal direction).

The blazed grating 7 can be manufactured by known holographic methods where a photosensitive plate is placed in the interference field of two collimated beams. This interference field can also be generated in the set-up of FIG. 1 when a second beam opposite to the direction of the reference beam is used for illumination and sample 6 is replaced by a high precision parallel plate. Such holographic gratings diffract the incoming light with an efficiency of up to 90% into the desired exit direction.

The interferometric thickness tester described here works also for slightly bent or curved samples; this case is represented in FIG. 2 where ray 20 samples two approximately opposite surface points within mirrors 5a, 5b. Parallelism and planeness of the sample surface, however, cannot be analyzed with this tester; as it is only sensitive to the vertical distance d between opposite surface points.

FIG. 3 shows another preferred embodiment of the invention in which the blazed grating 7 is replaced by a foldable mirror with plane mirrors 30a, 30b pivotably connected by hinge 31. The bisection of foldable mirror 30 with (half) apex angle $\beta$ is in the symmetry plane of the interferometric set-up together with sample 6. The angle of incidence $\alpha$, the distance D between flat mirrors 5a, 5b, the position of sample 6 within the symmetry plane and the apex angle $\beta$ of the folded mirror are interrelated and have to be chosen such that each ray samples exactly opposite points of sample surfaces 6. As angle $\alpha$ also determines the measurement resolution this second embodiment is easily adaptable to various sample characteristics and resolutions. FIG. 4 shows another example for an arrangement with large angles of incidence $\alpha$. In the embodiment of FIG. 1 a change of angle $\alpha$ requires also a blazed grating with a different grating constant.

The beam path in FIG. 3 is explained by tracing one of the marginal rays 32a, 32b. The incident ray is split at beam splitter 4 into reference ray 32a and measurement ray 32b which impinges on the upper surface of sample 6 after a first reflection at mirror 5a. Ray 32c reflected at the sample impinges on mirror 30a at point 34 which deflects it perpendicularly to the plane of symmetry to the second of the folded mirrors 30b from which it reaches point 36 of the sample as ray 32e. The ray 32f emanating from point 36 is reflected at plane mirror 5b and interferes as ray 32g with reference ray 32a which travels in the same direction.

The evaluation of the interference pattern is again performed by conventional pattern recognition systems or by electronic phase sensitive processing; in the latter case one of the plane mirrors 5a, 5b is periodically displaced.

What is claimed is:

1. Apparatus for interferometrically determining thickness variations in a flat object comprising, means arranging the object between two parallel flat mirrors,
   a beam splitter supported perpendicularly to the plane of said mirrors with means supplying a collimated light source to impinge at an oblique angle upon the beam splitter between the mirrors whereby a coherent reference beam is reflected from the beam splitter and a measurement beam passes through the beam splitter and is reflected to illuminate the upper surface of said object,
   means for deflecting the beam regularly reflected from the upper surface of the object such that it impinges at the same angle of incidence upon the lower surface of the object, and
   means for receiving the interfering pattern generated from superposition of the reference beam and the measurement beam.

2. The apparatus of claim 1 wherein said means for deflecting comprises a biased grating.

3. The apparatus of claim 2 wherein the angle of incidence of the collimated beam with respect for the splitter is greater than 75°.

4. The apparatus of claim 1 wherein said means for deflecting comprises a pair of folded mirrors supported with their bisector coincident with the plane of symmetry between the parallel mirrors.

* * * * *